United States Patent [19]
Lacey et al.

[11] Patent Number: 5,077,917
[45] Date of Patent: Jan. 7, 1992

[54] MANUAL STUMP REMOVAL TOOL

[76] Inventors: Herb L. Lacey, 1022 Medlin Dr., Cary, N.C. 27511; Fred D. Stump, 8100 Iron Bark Ct., Raleigh, N.C. 27606

[21] Appl. No.: 620,049

[22] Filed: Nov. 30, 1990

[51] Int. Cl.⁵ ............................................. A01C 11/00
[52] U.S. Cl. ...................................... 37/2 R; 111/101; 294/49
[58] Field of Search ................... 37/2 R, 2 P; 294/49, 294/51; 172/371; 111/99, 101; 173/30; 175/19

[56] References Cited

U.S. PATENT DOCUMENTS

| | | | |
|---|---|---|---|
| 573,597 | 12/1896 | Iwan | 294/49 |
| 881,657 | 3/1908 | Bittner | 37/2 R |
| 1,829,002 | 10/1931 | Gillogly | 37/2 R |
| 1,908,735 | 5/1933 | Donaldson | 294/49 |
| 2,247,958 | 7/1941 | Maxcy | 294/49 |
| 2,594,598 | 4/1952 | Timmins | 294/49 X |
| 2,716,538 | 8/1955 | Arrowood | 294/49 |
| 2,740,234 | 4/1956 | Van Norman | 37/2 R |
| 3,376,907 | 4/1968 | McNeal | 37/2 R |
| 3,868,775 | 3/1975 | Anderson | 294/49 X |
| 4,625,662 | 12/1986 | Heinzen | 37/2 R |
| 4,756,259 | 7/1988 | Korenek | 37/2 R |
| 4,916,984 | 4/1990 | Albert | 294/49 X |

FOREIGN PATENT DOCUMENTS

| | | | |
|---|---|---|---|
| 1203039 | 10/1965 | Fed. Rep. of Germany | 37/2 R |
| 427175 | 11/1947 | Italy | 37/2 R |

Primary Examiner—Randolph A. Reese
Assistant Examiner—Arlen L. Olsen
Attorney, Agent, or Firm—Rhodes, Coats & Bennett

[57] ABSTRACT

The present invention relates to a tool for removing a stump from the earth. In particular, the tool includes an elongated rod that is provided with a plate structure about a cutting end of the tool. The plate structure includes a bevelled cutting edge that is effective to cut through soil, rocks and roots that would typically surround and underlie a stump. In use, the tool is driven with a maul or hammer at approximately a 45° angle so as to cut a conical shaped chunk of soil from the earth with the stump and attached roots being held by the chunk of soil or dirt surrounding the same.

2 Claims, 2 Drawing Sheets

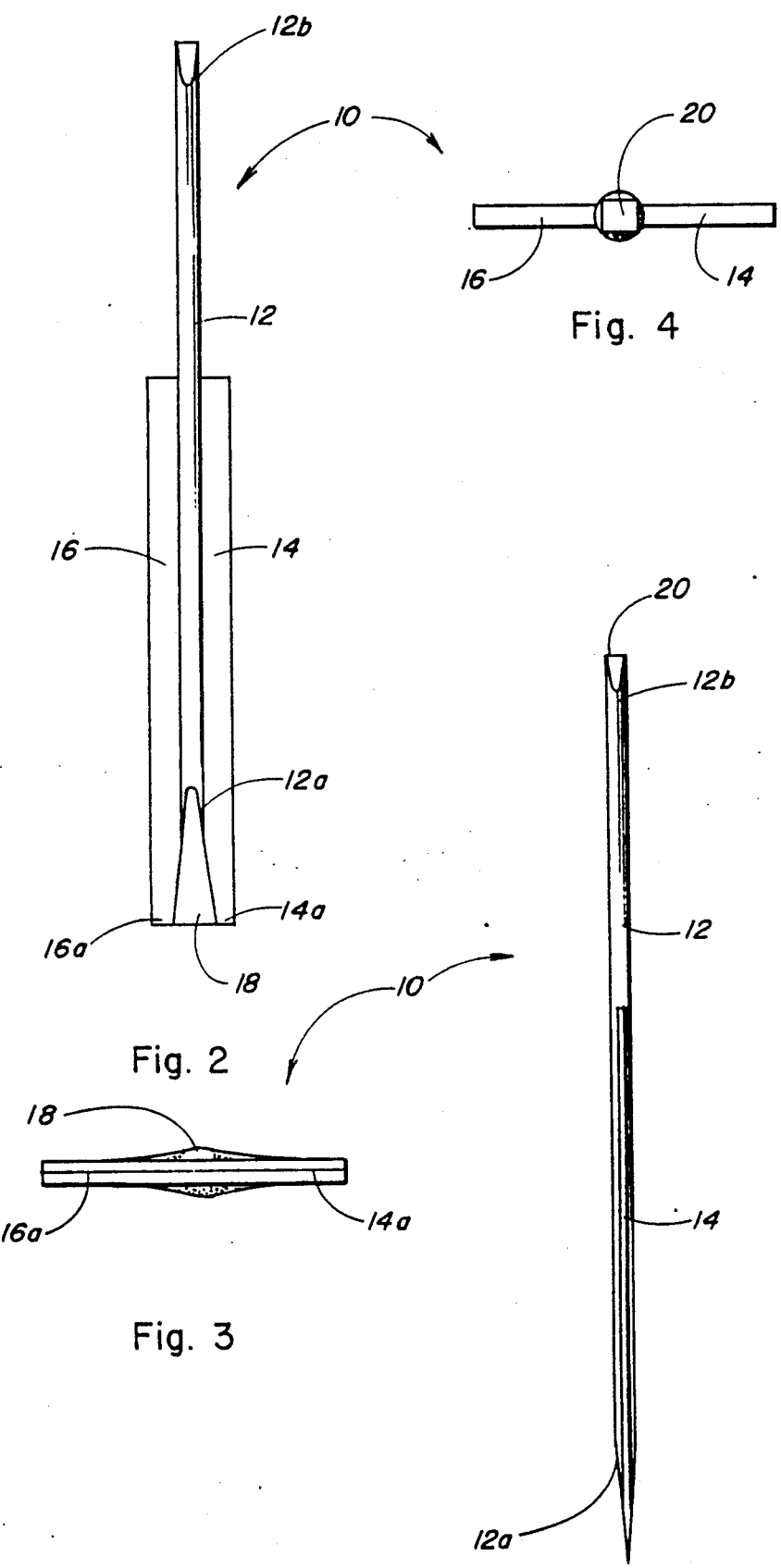

MANUAL STUMP REMOVAL TOOL

FIELD OF INVENTION

The present invention relates to stump removing tools and more particularly to a maul driven manual stump removal tool.

BACKGROUND OF THE INVENTION

There are, of course, many commercially available machines for removing stumps and large bushes and shrubs from the earth. But generally, these machines are large, expensive and not practical for the individual homeowner who desires to remove stumps or to transplant small trees and large shrubs, etc. There is and continues to be a need for a manually operated stump or bush removal tool that is effective and efficient.

SUMMARY AND OBJECTS OF THE INVENTION

The present invention entails a stump removal tool that is manually operated or driven by a maul or hammer. In particular, the stump removal tool of the present invention comprises an elongated rod having an impact end and a cutting end. Formed about the cutting end is a plate structure that includes a bevelled or tapered cutting edge that is effective to cut through soil, roots, rocks and the like.

Furthermore, the present invention entails a process for removing a stump or the like from the earth. In particular, the stump removal tool of the present invention is driven from the earth's surface downwardly and inwardly towards a central point underlying the stump. Because the stump removal tool is elongated and only cuts a thin slit, the tool is removed and another like slit is cut adjacent the previous slit. This cutting pattern is continued around the stump such that a circular cut appears along the earth's surface around the stump. But because of the angle of the cut, a conical chunk of soil is effectively cut from the earth and the stump and associated roots are attached to the chunk of soil.

It is therefore a principal object of the present invention to provide a stump removal tool that is manually driven.

Another object of the present invention is to provide a manual stump removal tool that is easy to use and which is effective and efficient in removing a stump, shrub, bush or the like from the earth.

Another object of the present invention resides in the provision of a method for removing a stump that enables the stump to be removed in an efficient and effective manner, and in the case of removing a whole shrub or small tree or the like, enables the root system of plant to be easily replanted in such a manner that there is a favorable prospect for the plant surviving.

Other objects and advantages of the present invention will become apparent and obvious from a study of the following description and the accompanying drawings which are merely illustrative of such invention.

BRIEF DESCRIPTION OF THE DRAWINGS

FIG. 2 is a top plan view of the stump removal tool of the present invention.

FIG. 3 is an end elevational view of the stump removal tool viewed from the cutting end thereof.

FIG. 4 is an end elevational view of the stump removal tool of the present invention shown from the impact end.

FIG. 5 is a side elevational view of the stump removal tool of the present invention.

DETAILED DESCRIPTION OF THE INVENTION

Figure 1:
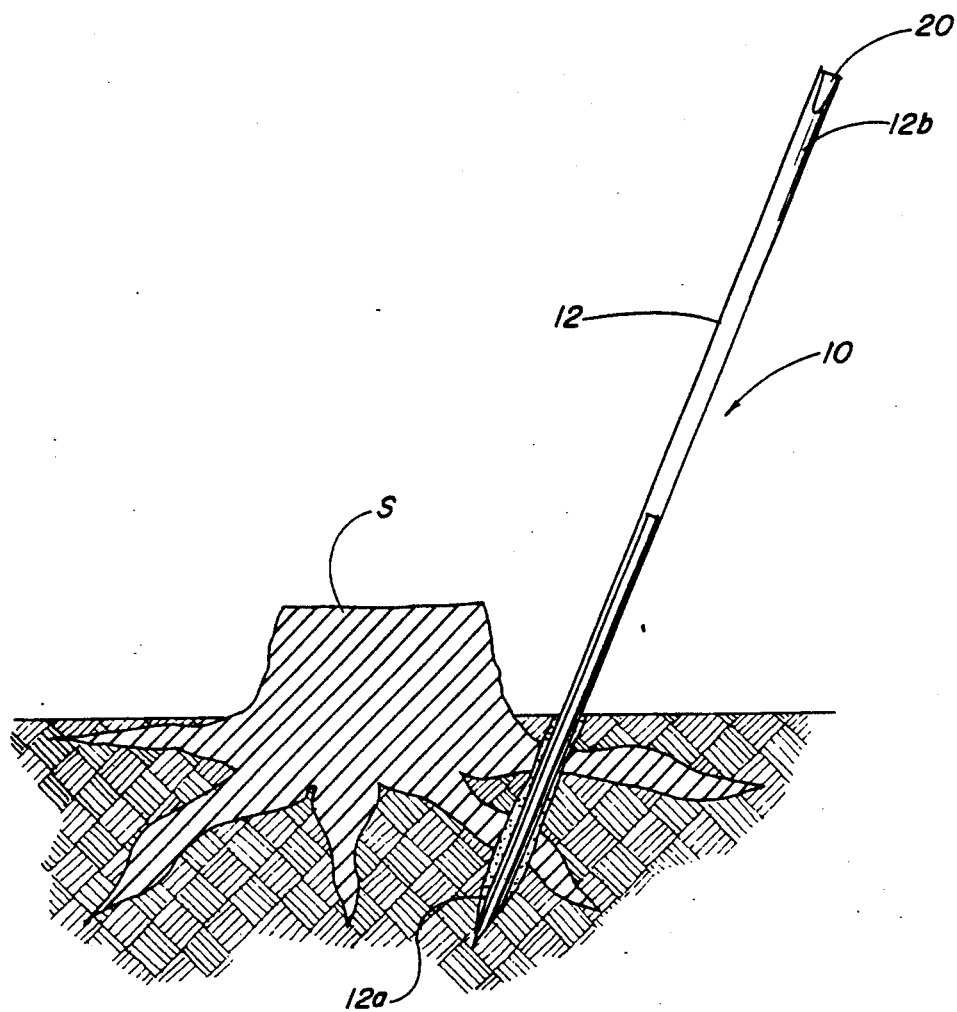
FIG. 1 is a side elevational view showing the use of the stump removal tool of the present invention.

The stump removal tool of the present invention is shown therein and indicated generally by the numeral 10. Stump removal 10 includes an elongated main rod 12 that includes a lower first end portion 12a and an upper second end portion 12b. As seen in the drawings, the rod is elongated. Secured to opposite sides of the rod 12 about the lower or first end portion 12a of the rod is a pair of plates 14 and 16. Each plate is elongated and relatively thin and narrow. The lower remote end of each plate 14 and 16 includes a bevelled end portion 14a and 16a respectively. These bevelled end portions form a cutting edge along the end of the plates 14 and 16.

To form a smooth cutting surface, the rod 12 about the lower first end portion 12a is also bevelled and includes a bevelled portion 18. Bevelled rod portion 18 blends with the bevelled end portions 14a and 16a of the plates so as to form a smooth and sharp cutting surface about the lower ends of the plates 14 and 16.

The stump removal 10 of the present invention is driven by a maul or hammer or the like. To accommodate a maul or hammer, the second end portion 12b or the upper end of the rod is provided with an impact end or surface 20. This, of course, enables the tool to be driven downwardly into the earth or the soil. The stump removal tool 10 of the present invention can be constructed of steel and typically, the plates 14 and 16 can be secured to the rod 12 by weldment. However, it is possible for the stump removal tool to be manufactured as a single piece unit.

Figure 1A:
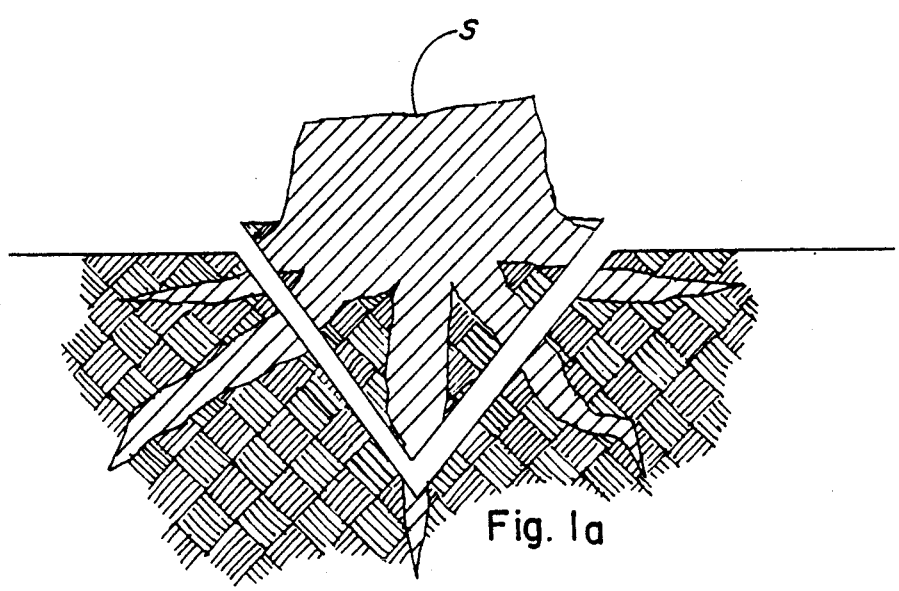
FIG. 1a is a side view illustrating a conical shaped chunk of soil, having a stump and cut roots attached thereto, cut by the stump removal tool of the present invention.

In order to remove the stump, referred to by the letter S in the drawings, the stump removing tool is positioned outside of the stump at an angle of approximately 45°. In this position, a maul or hammer is impacted against the upper remote impact end 20 of the tool causing the tool to be driven downwardly to a central point underneath the stump S. It is appreciated that as the stump tool 10 is driven downwardly and inwardly that the cutting edge formed by the plates 16 and 14 and the rod 12 cuts through roots, rock and other debris. Once the cutting edge has been driven to a central point beneath the stump, the entire stump removal tool 10 is removed and shifted to an adjacent position where the same process is continued. The stump removal tool is repeatedly driven through the soil at the same angle, approximately 45°, at various locations around the stump so as to cut a conical shaped chunk of soil from the earth. See FIG. 1A. It is appreciated that by this process or method that the stump S can be conveniently removed from the earth. It is also appreciated that the stump removing tool 10 of the present invention can be used to remove a bush, shrub, small tree or the like from the earth. Because of the nature of the chunk of soil removed, it follows that a tree, bush, shrub or the like can be replanted conveniently and easily. It should be pointed out that the nature of the cutting process with the stump removing tool 10 of the present invention tends to yield a chunk of soil that is rather healthy and hearty and wherein the soil tends to remain firmly attached to the removed chunk.

From the foregoing specification and discussion, it is appreciated that the stump removal tool 10 of the present invention presents a unique device for removing stumps, bushes, shrubs and small trees from the earth. Moreover, it is apparent that the stump removal tool of the present invention is practical, economical and easy to use.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A manual stump removing tool for cutting around and underneath a stump, including cutting roots associated with the stump, to form a conically shaped soil chunk underneath the stump itself that can be easily removed and transplanted if desired, said tool comprising: an elongated main rod having first and second end portions; a pair of relatively narrow and solid elongated wing plates secured to opposite sides of the first end portion of the main rod, each wing plate disposed in co-planar relationship with respect to the other and including a tapered end that forms a cutting edge; wherein the wing plates and rod form a closed plate and rod structure across the tool and wherein the first end portion of the main rod is also tapered to form a cutting edge and wherein the tapered cutting edge of the rod itself blends with the tapered end portions of the plates to form a transverse cutting edge about the first end of the main rod; and maul impact means formed about the second end portion of the main rod for receiving the impact from a maul or hammer-like object that is effective to power and force the stump removing tool downwardly through the soil and roots surrounding the stump.

2. The manual stump removal tool of claim 1 wherein the rod and wings form an elongated, straight and non-curved implement that offers a minimum of resistance as it is driven underneath a stump by a maul or hammer-like object striking the maul impact means formed about the second end portion of the main rod.

* * * * *